(12) United States Patent
Sakakura et al.

(10) Patent No.: US 8,250,272 B2
(45) Date of Patent: Aug. 21, 2012

(54) INTERRUPT CONTROL APPARATUS AND IMAGE FORMING APPARATUS

(75) Inventors: Keita Sakakura, Kanagawa (JP);
Hiroaki Yamamoto, Kanagawa (JP);
Yuichi Kawata, Kanagawa (JP);
Masahiko Kikuchi, Kanagawa (JP);
Masakazu Kawashita, Kanagawa (JP);
Yoshifumi Bando, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 167 days.

(21) Appl. No.: 12/566,005

(22) Filed: Sep. 24, 2009

(65) Prior Publication Data

US 2010/0241778 A1    Sep. 23, 2010

(30) Foreign Application Priority Data

Mar. 18, 2009    (JP) .................................. 2009-065746

(51) Int. Cl.
*G06F 13/26* (2006.01)
*G06F 13/24* (2006.01)
*H04N 1/23* (2006.01)
*H04N 1/00* (2006.01)
(52) U.S. Cl. ......... 710/264; 710/260; 358/296; 358/401
(58) Field of Classification Search .................. 710/264, 710/260; 358/296, 401
See application file for complete search history.

(56) References Cited

U.S. PATENT DOCUMENTS

| | | | | |
|---|---|---|---|---|
| 5,280,628 A | * | 1/1994 | Nakayama | 710/260 |
| 5,493,408 A | * | 2/1996 | Kurogane et al. | 358/296 |
| 5,568,649 A | * | 10/1996 | MacDonald et al. | 710/48 |
| 7,421,521 B2 | * | 9/2008 | Trainin | 710/45 |
| 7,433,063 B2 | * | 10/2008 | Miyahara et al. | 358/1.13 |
| 2009/0019203 A1 | * | 1/2009 | Lee et al. | 710/260 |

FOREIGN PATENT DOCUMENTS

| | | |
|---|---|---|
| JP | 53-145536 | 12/1978 |
| JP | 3-167633 A | 7/1991 |
| JP | 7-168723 A | 7/1995 |
| JP | 09-223091 A | 8/1997 |
| JP | 10-312360 A | 11/1998 |
| JP | 2001-256060 A | 9/2001 |
| JP | 2002366369 A | 12/2002 |
| JP | 2005-267294 A | 9/2005 |

OTHER PUBLICATIONS

Japanese Office Action dated Jan. 11, 2011 for corresponding Japanese patent application No. 2009-065746.
Japanese Patent Office Action dated Sep. 13, 2011.

* cited by examiner

*Primary Examiner* — Paul R Myers
*Assistant Examiner* — Christopher A Daley
(74) *Attorney, Agent, or Firm* — Sughrue Mion, PLLC

(57) ABSTRACT

An interrupt control apparatus includes: an interrupt request supply unit that supplies interrupt request information; a processing unit that performs interrupt processing based on the interrupt request information supplied by the interrupt request supply unit; and a time measuring unit that is used to measure an elapse of a predefined time period from a time point when the interrupt request supply unit starts to supply the interrupt request information, wherein: even if new interrupt cause information is stored during the time when the time measuring unit is measuring the elapse of the predefined time period, the interrupt request supply unit does not supply interrupt request information based on the new interrupt cause information to the processing unit; and after the elapsed time measured by the time measuring unit reaches the predefined time period, the interrupt request supply unit supplies the interrupt request information to the processing unit.

9 Claims, 4 Drawing Sheets

INTERRUPT CONTROL APPARATUS AND IMAGE FORMING APPARATUS

CROSS-REFERENCE TO RELATED APPLICATIONS

This application claims priority under 35 USC 119 from a Japanese patent application No. 2009-065746 filed on Mar. 18, 2009.

BACKGROUND

1. Technical Field

The present invention relates to an interrupt control apparatus and to an image forming apparatus.

2. Related Art

Techniques for controlling a timing of supply of an interrupt request based on reception of data are well known.

SUMMARY

According to one aspect of the invention, there is provided an interrupt control apparatus including: a receiving unit that receives communication information sent from an external device via a communication line; a memory that stores interrupt cause information that indicates an interrupt cause generated based on the communication information received by the receiving unit; an interrupt request supply unit that supplies interrupt request information based on the interrupt cause information stored in the memory; a processing unit that performs interrupt processing based on the interrupt request information supplied by the interrupt request supply unit; and a time measuring unit that is used to measure an elapse of a predefined time period from a time point when the interrupt request supply unit starts to supply the interrupt request information, wherein: even if new interrupt cause information is stored in the memory during the time when the time measuring unit is measuring the elapse of the predefined time period, the interrupt request supply unit does not supply interrupt request information based on the new interrupt cause information to the processing unit; and after the elapsed time measured by the time measuring unit reaches the predefined time period, the interrupt request supply unit supplies the interrupt request information to the processing unit.

BRIEF DESCRIPTION OF THE DRAWINGS

An exemplary embodiment of the present invention will now be described in detail based on the following figures, wherein.

DETAILED DESCRIPTION

1. Configuration

Figure 1:
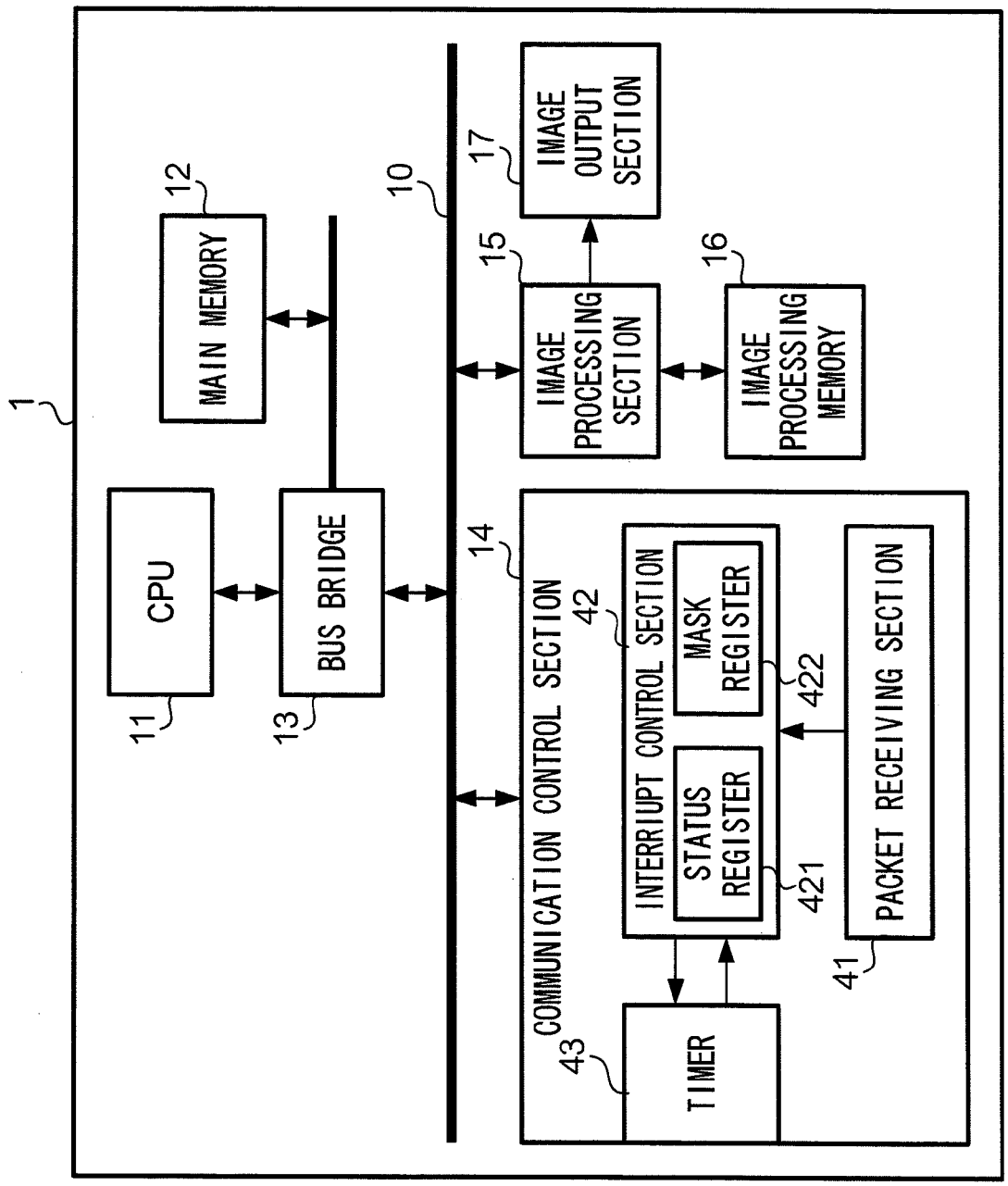
FIG. 1 is a block diagram showing the configuration of an image forming apparatus according to an exemplary embodiment of the present invention.

FIG. 1 is a block diagram showing the configuration of an image forming apparatus 1 according to an exemplary embodiment of the present invention. As shown in FIG. 1, the image forming apparatus 1 includes a CPU (central processing unit) 11; a main memory 12; a bus bridge 13; a communication control section 14; an image processing section 15; an image processing memory 16; and an image output section 17. The CPU 11 controls the above-described sections, etc. of the image forming apparatus 1 by executing programs stored in the main memory 12. The main memory 12 includes ROM (read only memory) and RAM (random access memory), for example, and stores programs and data for execution by the CPU 11. The bus bridge 13 connects the CPU 11 and the main memory 12 to a bus 10. In addition to the bus bridge 13, the communication control section 14 and the image processing section 15 are connected to the bus 10. The communication control section 14 establishes communication with external devices via communication lines and transmits (receives) data to (from) the external devices. The image processing section 15 can perform a variety of different kinds of image processing on image data received by the communication control section 14. The image processing memory 16 is used by the image processing section 15 and serves as a working area when the image processing section 15 performs image processing. The image output section 17 is, for example, a printer that forms images by use of xerography technology, and forms images corresponding to the image data processed by the image processing section 15 and outputs the images on a media, for example a paper. The image output section 17 is an example of an image forming unit according to the exemplary embodiment of the present invention.

Next, the configuration of the communication control section 14 will be described in detail. The communication control section 14 is an example of an interrupt control apparatus according to the exemplary embodiment of the present invention that is used in conjunction with the above-described CPU 11. As shown in FIG. 1, the communication control section 14 includes a packet receiving section 41, an interrupt control section 42 and a timer 43. The packet receiving section 41 is an example of a receiving unit according to the exemplary embodiment of the present invention, and receives data (communication information) sent from the above-described external devices via communication lines. The timer 43 is an example of a time measuring unit according to the exemplary embodiment of the present invention. The timer 41 is used to measure an elapse of a predefined time period or elapse of a time period specified by the interrupt control section 42. The interrupt control section 42 is an example of an interrupt request supplying unit according to the exemplary embodiment of the present invention, and supplies interrupt request information to the CPU 11 when the packet receiving section 41 receives data. If the packet receiving section 41 frequently receives data, the interrupt control section 42 controls a timing for supply of interrupt request information to CPU 11.

The interrupt control section 42 includes a status register 421 and a mask register 422. The status register 421 is an example of a memory according to the exemplary embodiment of the present invention, and stores interrupt cause information that indicates interrupt causes generated based upon reception of data. The mask register 422 stores a first interrupt mask bit and a second interrupt mask bit. The first interrupt mask bit and the second interrupt mask bit indicate information whether supply of interrupt request information to the CPU 11 is permitted or not. For example, if both the first interrupt mask bit and the second interrupt mask bit are "0", supply of the interrupt request information is permitted. On the other hand, if either of the first interrupt mask bit or the second interrupt mask bit is "1", supply of new interrupt request information is not permitted. However, in a case where new data are received during the time when the interrupt request is "on", supply of the new interrupt request information to CPU 11 is permitted, in so far as that the first interrupt mask bit is "1".

2. Behavior

Figure 2:
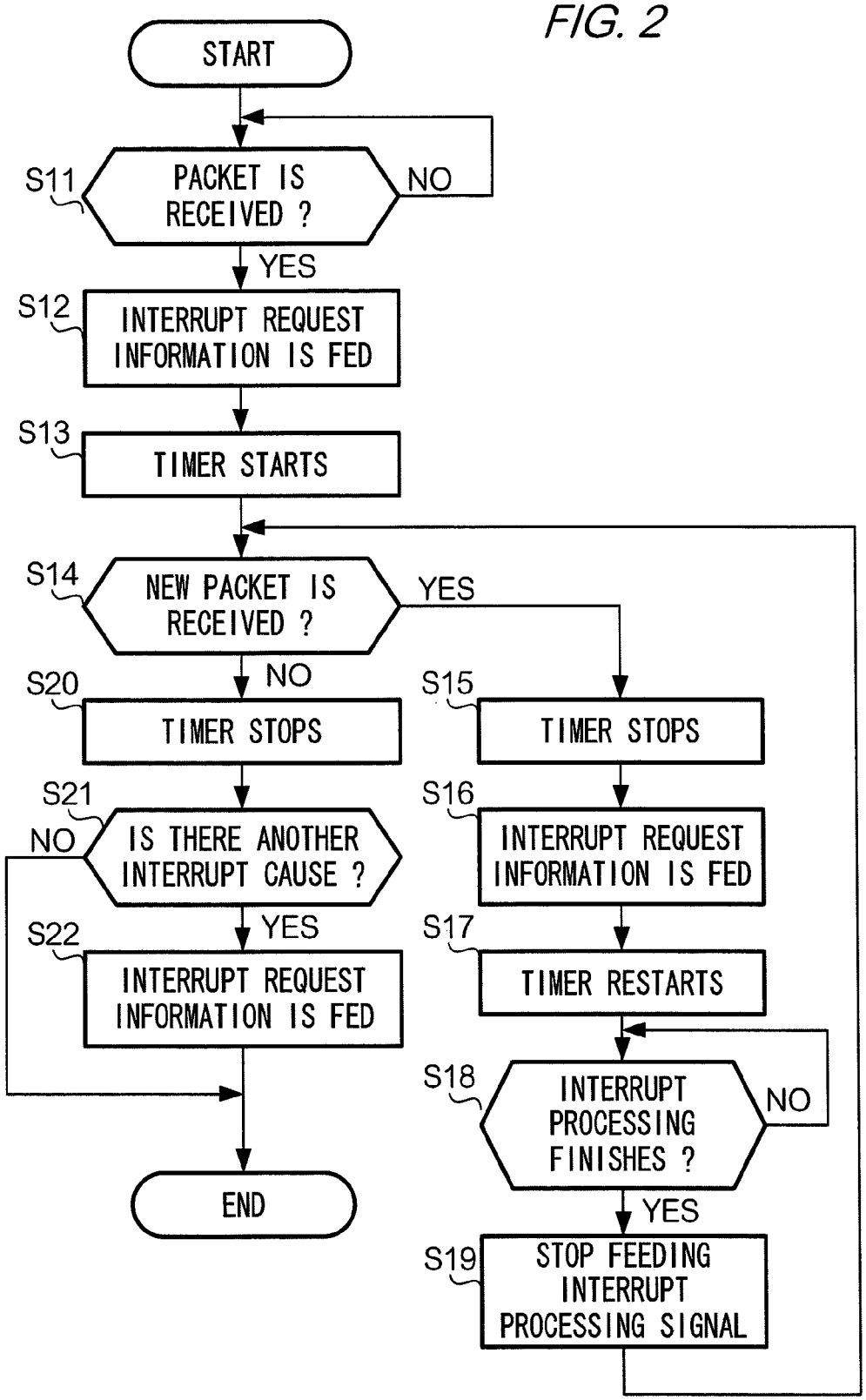
FIG. 2 is a flowchart showing an interrupt request processing of the image forming apparatus.

Next, the functionality of the image forming apparatus 1 according to this exemplary embodiment will be described. Interrupt request processing is performed based on reception of a packet in the image forming apparatus 1. An outline of the interrupt request processing will now be described below with reference to the flowchart of FIG. 2.

If the packet receiving section 41 receives a packet when the timer 43 is not running (YES at step 11), the interrupt control section 42 supplies an interrupt request information to the CPU 11 (at step 12). Next, the interrupt control section 42 starts the timer 43 (at step 13). Consequently the timer 43 begins to run and starts to measure the elapsed time. Then, the interrupt control section 42 judges whether a new packet is received or not during the running period of the timer 43 (at step 14). If the new packet is received during the running period of the timer 43 (YES at step 14), after the elapsed time measured by the timer 43 reaches a predefined time period (at step 15), the interrupt control section 42 supplies the interrupt request information to the CPU 11 (at step 16). Next, the interrupt control section 42 restarts the timer 43 (at step 17). Next, the interrupt control section 42 remains in a waiting state until the interrupt processing corresponding to an interrupt cause generated by the reception of the packet at step 14 finishes (NO at step 18). When the interrupt processing finishes (YES at step 18), the interrupt control section 42 stops supply of the interrupt request information (at step 19), and the flow of the interrupt request processing goes back to step 14.

At step 14, if a new packet is not received during the running period of the timer 43 (NO at step 14), the interrupt control section 42 judges whether another interrupt cause remains or not (at step 21) after the elapsed time measured by the timer 43 reaches the predefined time period (at step 20). If another interrupt cause does not remain (NO at step 21), the interrupt control section 42 terminates the interrupt request processing. On the other hand, if another interrupt cause remains (YES at step 21), the interrupt control section 42 supplies the interrupt request information to the CPU 11 (at step 22), and then terminates this interrupt request processing.

Figure 3:
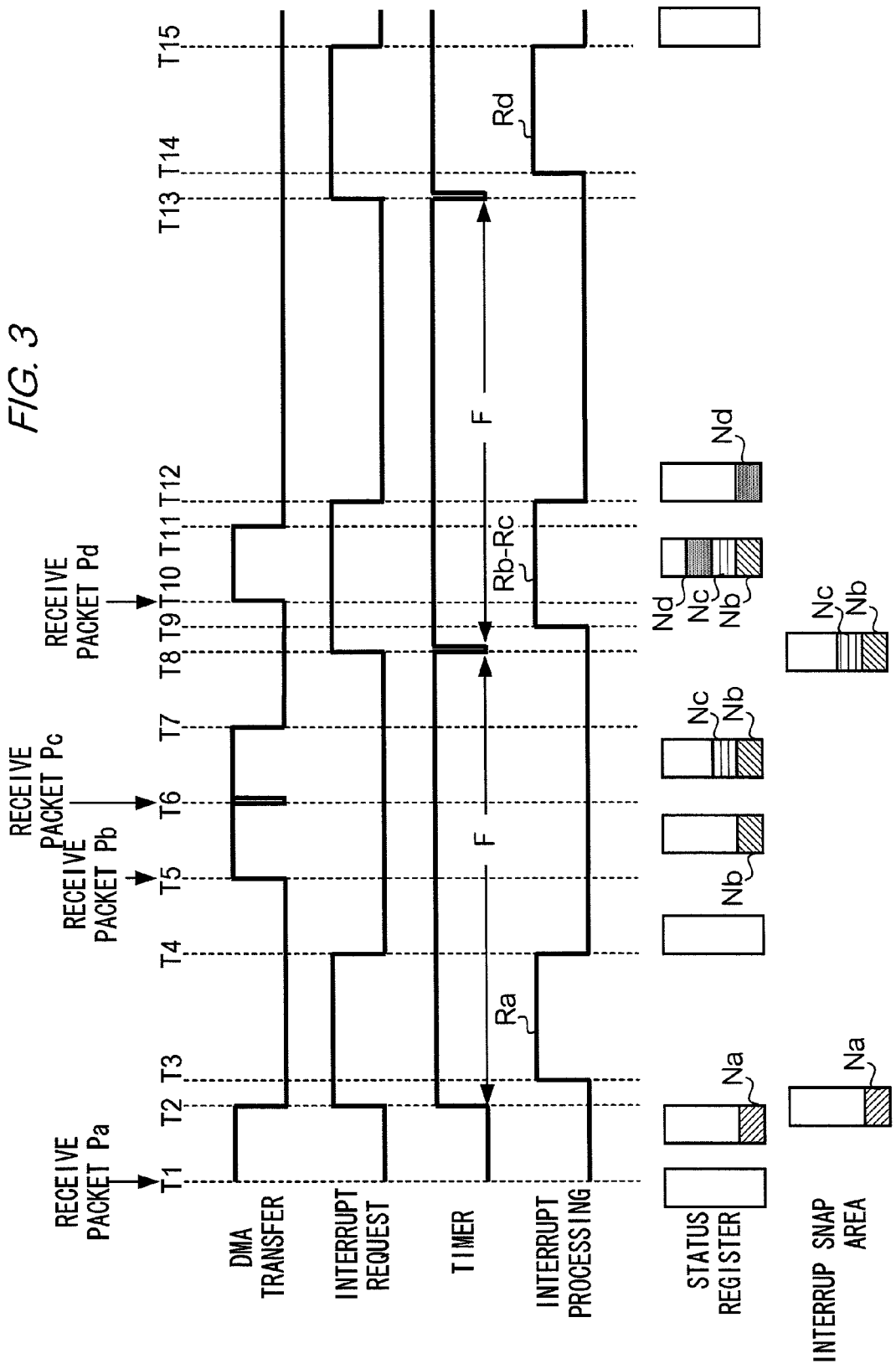
FIG. 3 is a time chart showing the interrupt request processing.

Next, the interrupt request processing will be concretely described with reference to the timing chart of FIG. 3. It is assumed that image data are sent in the form of packets from an external device here. The packet receiving section 41 receives a packet Pa at the time T1, and the packet Pa is transferred to the main memory 12 using DMA (direct memory access). A DMA transfer is a transfer in which the communication control section 14 directly transfers data to the main memory 12 without the CPU 11's involvement with the data transfer to store the data on the main memory 12. When the packet Pa is received by the packet receiving section 41, the interrupt control section 42 makes the status register 421 store interrupt cause information Na that indicates an interrupt cause generated based on the reception of the packet Pa. This interrupt cause information Na includes the address that indicates the storage space for the packet Pa on the main memory 12.

At the time T2, when the DMA transfer finishes, the interrupt control section 42 begins to supply an interrupt request information to the CPU 11. Consequently an interrupt request is generated. At the time T2, the interrupt control section 42 also sets up a time period F and starts the timer 43. Consequently the timer begins to run and starts to measure the elapse of the time period F. In other words, the timer 43 starts to measure the elapse of the predefined time period from the time point when the interrupt control section 42 starts to supply interrupt request information. When the timer 43 starts, the interrupt control section 42 sets the first interrupt mask bit stored in the mask register 422 to "1". In addition, the interrupt control section 42 generates a snapshot of the status register 421 at the time T2, and stores the snapshot in an interrupt snap area of the status register 421. The snapshot is a copy of information that indicates the contents stored in the status register 421. In this case, the interrupt cause information Na is stored in the interrupt snap area, as the snapshot.

After the interrupt control section 42 starts to supply the interrupt request information to the CPU 11 at the time T2, the CPU 11 starts interrupt processing Ra corresponding to the interrupt cause information Na stored in the status register 421. In this interrupt processing Ra, processes such as reading out the packet Pa stored in the address indicated by the interrupt cause information Na and supply of the read-out packet Pa to the image output section 17 via the image processing section 15 are performed. In other words, the CPU 11 is an example of a processing unit according to the exemplary embodiment of the present invention. Triggered by the interrupt request information fed by the interrupt control section 42, the CPU 11 performs the interrupt processing corresponding to the interrupt cause information stored in the status register 421. After the interrupt processing Ra is over at the time T4, the interrupt control section 42 erases the interrupt cause information Na from the status register 421. Because the interrupt cause information is erased from the status register 421 as mentioned above, the interrupt control section 42 stops to supply of the interrupt request information, with the result that the interrupt request is set to "off". Above description has been done about the case where one piece of interrupt cause information is stored in the status register 421. In the case where plural pieces of interrupt cause information are stored in the status register 421, if the packet receiving section 41 receives data, the interrupt control section 42 continues supply of the interrupt request information to the CPU 11 until a time that the interrupt control section 42 completes plural pieces of interrupt processing corresponding to all pieces of interrupt cause information stored in the status register 421.

Then, if the packet receiving section 41 receives a packet Pb at the time T5, the packet Pb is transferred to the main memory 12 using DMA as mentioned above. After the packet Pb is received by the packet receiving section 41, the interrupt control section 42 stores interrupt cause information Nb that indicates an interrupt cause generated by the reception of the packet Pb in the status register 421. In addition, if the packet receiving section 41 receives a packet Pc at the time T6, the packet Pc is also transferred to the main memory 12 using DMA. After the packet Pc is received by the packet receiving section 41, the interrupt control section 42 stores interrupt cause information Nc that indicates an interrupt cause generated by the reception of the packet Pc in the status register 421. Therefore, both the interrupt cause information Nb and the interrupt cause information Nc are stored in the status register 421.

Even though the DMA transfer of the packet Pc finishes at the time T7, the interrupt control section 42 remains in a waiting state until the elapsed time measured by the timer 43 reaches the time period F because the first interrupt mask bit stored in the mask register 422 is "1". After the elapsed time measured by the timer 43 reaches the time period F at the time T8, the interrupt control section 42 sets the first interrupt mask bit stored in the mask register 422 to "0", and supplies the interrupt request information to the CPU 11, with the result that the interrupt request is generated. In other words, the interrupt control section 42 does not supply new interrupt request information to the CPU 11 during the running period of the timer 43. After the elapsed time measured by the timer 43 reaches the time period F, the interrupt control section 42 supplies the interrupt request information to the CPU 11.

Because the interrupt cause information Nb and Nc are stored in the status register 421, the interrupt control section 42 again sets up the time period F and starts the timer 43 at the time T8. Therefore the timer 43 begins to run and measure the elapse of the time period F from scratch. After the timer 43 starts, the interrupt control section 42 sets the first interrupt mask bit stored in the mask register 422 to "1". In addition, the interrupt control section 42 generates a snapshot of the status register 421 at the time T8, and stores the snapshot in the interrupt snap area of the status register 421. In this example, the interrupt cause information Nb and Nc are stored in the interrupt snap area, as the snapshot. After the CPU 11 is fed with the interrupt request information by the interrupt control section 42 at the time T8, the CPU 11 starts to perform interrupt processing Rb-Rc corresponding to the interrupt cause information Nb and Nc stored in the status register 421 at the time T9, where the interrupt processing Rb-Rc represents a combination of interrupt processing Rb and Rc that are sequentially performed.

Next, if the packet receiving section 41 receives a packet Pd at the time T10 during the time when the interrupt processing Rb-Rc is being performed, the packet Pd is transferred to the main memory 12 using DMA. After the packet Pd is received by the packet receiving section 41, the interrupt control section 42 stores interrupt cause information Nd that indicates an interrupt cause generated by the reception of the packet Pd in the status register 421. Consequently, the interrupt cause information Nd, as well as the above-mentioned interrupt cause information Nb and Nc, is stored in the status register 421. In this way, in the case where the new packet Pd is received during the time when the interrupt request is "on", the interrupt control section 42 becomes able to specify the newly stored interrupt cause information Nd in the interrupt snap area of the status register 421. Next, the interrupt control section 42 remains in a waiting state until the interrupt processing Rb-Rc corresponding to the interrupt cause information Nb and Nc other than the interrupt cause information Nd finishes. After the interrupt processing Rb-Rc finishes at the time 12, the interrupt control section 42 erases the interrupt cause information Nb and Nc from the status register 421, and at the same time sets the second interrupt mask bit stored in the mask register 422 to "1". When the second interrupt mask bit becomes "1", the interrupt control section 42 stops supply of the interrupt request information. As a result, the interrupt cause information Nd remains in the status register, while the interrupt request is set to "off".

After the elapsed time measured by the timer 13 reaches the time period F at the time T13, the interrupt control section 42 sets both the first interrupt mask bit and the second interrupt mask bit to "0", and supplies the interrupt request information to CPU 11, with the result that the interrupt request is generated. To put it simply, when the packet receiving section 41 receives new data during the time when the timer 43 is measuring the elapse of a predefined time period, the interrupt control section 42 specifies a piece of interrupt cause information out of interrupt cause information stored in the status register 421 based on the newly received data, but does not supply the interrupt request information corresponding to the specified piece of interrupt cause information to the CPU 11. After the elapsed time reaches the predefined time period, the interrupt control section 42 supplies the interrupt request information to the CPU 11.

After the CPU 11 is supplied with the interrupt request information by the interrupt control section 42 at the time T13, the CPU 11 starts to perform the interrupt processing Rd corresponding to the interrupt cause information Nd stored in the status register 421 at the time T14. After the interrupt processing Rd is over at the time T15, the interrupt control section 42 erases the interrupt cause information Nd from the status register 421. Because the interrupt cause information is erased from the status register 421, the interrupt control section 42 stops supply of the interrupt request information, with the result that the interrupt request is set to "off".

The interrupt processing of a conventional image forming apparatus that does not employ the configuration according to the exemplary embodiment of the present invention will be described hereinafter with reference to FIG. 4. In the case of the conventional image forming apparatus, the interrupt control section 42 checks whether all pieces of the interrupt cause information are erased from the status register 421 after the interrupt processing Rb-Rc finishes at the time T12. In an example shown in FIG. 4, the interrupt cause information Nd remains in the status register 421 at the time T12. In this case, the interrupt control section 42 continues supply of the interrupt request information to CPU 11. Here, the first interrupt mask bit is "1" at the time T12 when the timer 43 operates. The reason why the interrupt request information nevertheless continues to be fed to the CPU 11 is that, even if during a time when the interrupt request is "on" new data are received, supply of new interrupt request information to the CPU 11 remains allowable under a condition that only the first interrupt mask bit is "1".

Figure 4:
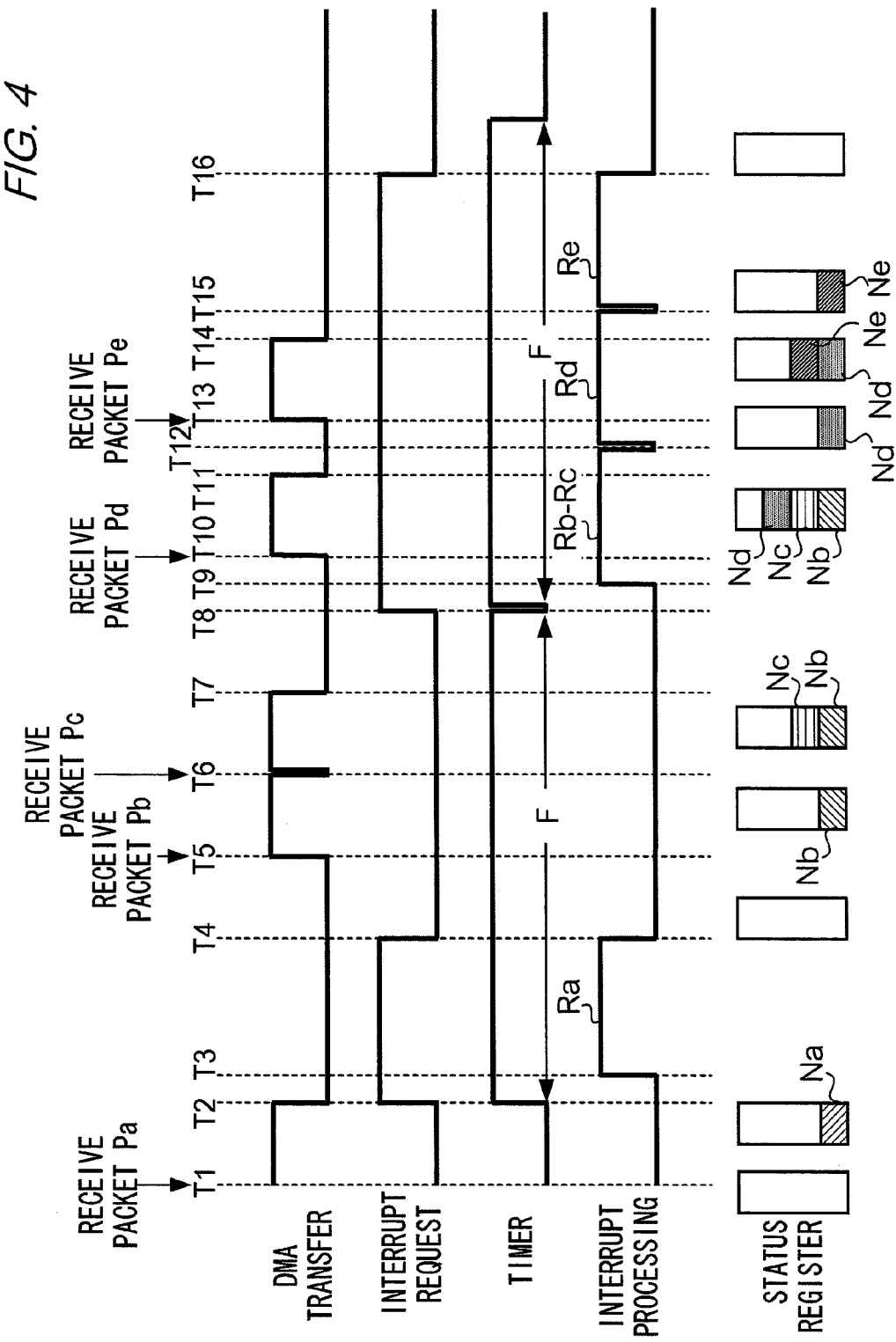
FIG. 4 is a time chart showing an interrupt request processing of a conventional image forming apparatus that does not employ the configuration of the image forming apparatus according to the exemplary embodiment of the present invention.

In addition, as shown in FIG. 4, if the packet receiving section 41 receives a packet Pe at the time T13 during the time when the interrupt processing Rd is performed, interrupt cause information Ne that indicates an interrupt cause generated by reception of the packet Pe is stored in the status register 421. At the time T15 when the interrupt processing Rd corresponding to the interrupt cause information Nd finishes, the interrupt cause information Ne still remains in the status register 421, so that the interrupt control section 42 continues with supply of the interrupt request information to the CPU 11.

In this way, in the interrupt processing that does not employ the configuration according to the exemplary embodiment of the present invention, the interrupt request is not set to "off" as long as any interrupt cause information remains in the status register 421, so that the interrupt request information continues to be fed to the CPU 11 if new data are more than once received during the time when the interrupt request is "on". In this case there is a possibility that the CPU 11 performs many pieces of interrupt processing sequentially, resulting in adverse effects on the original processing operations of the CPU 11. In addition, although the generation of the interrupt request is controlled by using the timer in order to reduce loads on the CPU 11, it becomes necessary to perform the interrupt processing in a short period of time, and a concentration of a load on the CPU 11 is not reduced. In the case of communication via a higher speed communication line, the above-described phenomenon becomes more conspicuous.

3. Modifications

Although one exemplary embodiment of the present invention has been described as above, the contents of this exemplary embodiment may be modified as shown in the following modifications and appropriate combinations of a number of the modifications can be conceived of and implemented without in any way departing from the spirit and scope of the present invention.

3-1. First Modification

In the above-described exemplary embodiment, although the interrupt control section 42 sets the second interrupt mask bit stored in the mask register 422 to "1" at the time T12 when the interrupt processing Rb-Rc finishes, it is not always necessary for the second interrupt mask bit to be set to "1" is this timing. For example, effective operation could be also obtained if the interrupt control section 42 sets the second interrupt mask bit of the mask register 422 to "1" at a time when only the interrupt processing Rb corresponding to the interrupt cause information Nb finishes. Stated simply, in a case where new data are received by the packet receiving section 41 during the time when the interrupt request is "on", effective operation could be also obtained if the interrupt control section 42 does not supply the interrupt request information to the CPU 11 during the time period from the finish time of the interrupt processing, which is performed by the CPU11 based on at least one interrupt cause information stored in the status register 421, to the time when the elapsed time measured by the timer 43 reaches the specified time period.

3-2. Second Modification

In the above-described exemplary embodiment, the generated snapshots are stored in the interrupt snap area of the status register 421, but the storage spaces for the snapshots are not limited to the interrupt snap space of the status register 421. For example, a variant can be conceived of whereby it would be possible to store the generated snapshots in a memory that is provided for the particular purpose of storing such snapshots in the communication control section 14.

3-3. Third Modification

In the above-described exemplary embodiment, although the interrupt control section 42 includes the status register 421 and the mask register 422, a variant can be conceived of whereby it would be possible for the CPU 11 itself to include these registers, rather than providing them in the interrupt control section 42.

3-4. Fourth Modification

In the above-described exemplary embodiment, although the addresses that indicate the storage spaces to store the received packets in the main memory 12 are included in the interrupt cause information, it is not always necessary for the addresses to be included in the interrupt cause information. As an alternative, for example, effective operation could be also obtained if the addresses are stored in conjunction with the interrupt cause information. In addition, a further alternative may be to use names of the packets or the like instead of the addresses in order to indicate storage spaces for storage of the packets.

3-5. Fifth Modification

In the above-described exemplary embodiment, the processes performed by the communication control section 14 may be performed by a single hardware resource or plural hardware resources, or by the CPU 11's executing a single program or plural programs instead.

In addition, the above-described single or plural programs may be provided via computer-readable recording media-such as magnetic recording media like magnetic tapes and magnetic disks; optical recording media like photo disks; magneto-optical media; and semiconductor memories. These programs may be also obtained by being downloaded from communication networks such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An interrupt control apparatus comprising:
    a receiver that receives communication information sent from an external device via a communication line;
    a memory that stores interrupt cause information that indicates an interrupt cause generated based on the communication information received by the receiver;
    an interrupt controller that writes in the memory interrupt cause information when the receiver receives the communication information, and
    a timer that measures a predefined time period by an instruction from the interrupt controller,
    wherein the interrupt controller is configured such that:
        if the receiver receives first communication information, then in response to the receiver receiving the first communication information:
            the interrupt controller writes first interrupt cause information in the memory, and
            if the timer is not measuring the predefined time period when the receiver receives the first communication information, then the interrupt controller:
                supplies a first interrupt request to a processor, and
                controls the timer to start measuring the predefined time period,
                wherein the processor performs interrupt processing in response to the processor receiving an interrupt request, and
            if the receiver receives second communication information while the timer is measuring the predefined time period, then in response to the receiver receiving the second communication information while the timer is measuring the predefined time period:
                the interrupt controller waits without supplying the interrupt request to the processor—until the timer finishes measuring the predefined time period, and
                after the timer finishes measuring the predefined time period, the interrupt controller then supplies the interrupt request to the processor.

2. The interrupt control apparatus according to claim 1, wherein the interrupt controller is configured such that, if the receiver receives the second communication information while the timer is measuring the predefined time period, then the interrupt controller supplies a second interrupt request after the timer finishes measuring the predefined time period without supplying an interrupt request.

3. The interrupt control apparatus according to claim 2, wherein the interrupt controller is configured to control the timer to re-start measuring the predefined time period after the interrupt controller supplies the second interrupt request.

4. The interrupt control apparatus according to claim 3, wherein the interrupt controller is configured to stop supplying the second interrupt request after the timer finishes restarted measurement of the predefined time period.

5. The interrupt control apparatus according to claim 1, wherein the interrupt controller is configured to erase the first interrupt cause information when the processor finishes the interrupt processing triggered by the first interrupt request.

6. The interrupt control apparatus according to claim 1, wherein the interrupt controller is configured such that:
   if the timer finishes measuring the predefined time period, then the interrupt controller determines whether any other interrupt cause information is stored in the memory, and
   if the interrupt controller determines that any other interrupt cause information is stored in the memory, then the interrupt controller supplies another interrupt request.

7. The interrupt control apparatus according to claim 1, wherein the interrupt request is sent by a signal which maintains a first level until the processor finishes the interrupt processing.

8. The interrupt control apparatus according to claim 1, wherein the communication information includes image data.

9. An image forming apparatus comprising:
   a processor that performs interrupt processing when the processor receives an interrupt request;
   a receiver that receives image data sent from an external device via a communication line;
   a memory that stores interrupt cause information that indicates an interrupt cause generated based on the image data received by the receiver;
   an interrupt controller that writes in the memory interrupt cause information when the receiver receives the image data;
   a timer that measures a predefined time period based on an instruction from the interrupt controller; and
   an image forming unit that forms images on recording media based on the image data received by the receiver,
   wherein the interrupt controller is configured such that:
      if the receiver receives first image data, then in response to the receiver receiving the first image data:
         the interrupt controller writes first interrupt cause information into the memory, and
         if the timer is not measuring the predefined time period when the receiver receives the first image data, then the interrupt controller:
            supplies a first interrupt request to a processor, and
            controls the timer to start measuring the predefined time period, and
      if the receiver receives second image data while the timer is measuring the predefined time period, then in response to the receiver receiving the second image data while the timer is measuring the predefined time period:
         the interrupt controller waits without supplying the interrupt request to the processor until the timer finishes measuring the predefined time period, and
   after the timer finishes measuring the predefined time period, the interrupt controller then supplies the interrupt request to the processor.

* * * * *